United States Patent
Liu

(10) Patent No.: US 8,247,105 B2
(45) Date of Patent: Aug. 21, 2012

(54) BATTERY HOLDER AND POWER SUPPLY USING THE SAME

(75) Inventor: Zhi-Hua Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 410 days.

(21) Appl. No.: 12/579,584

(22) Filed: Oct. 15, 2009

(65) Prior Publication Data

US 2011/0003186 A1    Jan. 6, 2011

(30) Foreign Application Priority Data

Jul. 6, 2009    (CN) .......................... 2009 1 0304041

(51) Int. Cl.
*H01M 2/10* (2006.01)

(52) U.S. Cl. ...................... 429/100; 429/123; 429/163

(58) Field of Classification Search .................... 429/96, 429/100

See application file for complete search history.

(56) References Cited

U.S. PATENT DOCUMENTS

| 4,213,078 A  * | 7/1980 | Ferrell et al. ................... 320/107 |
| 2010/0177507 A1 * | 7/2010 | West et al. ..................... 362/183 |

* cited by examiner

*Primary Examiner* — Keith Walker
(74) *Attorney, Agent, or Firm* — Altis Law Group, Inc.

(57) ABSTRACT

A power supply includes a battery and a battery holder. The battery includes a positive electrode protruding outwardly and a negative electrode opposite the positive electrode. The battery holder includes a housing to receive the battery defining a latching groove in an inner surface thereof; an elastic member fixed in the housing and resisting the negative electrode of the battery; a protecting member positioned in the housing including an insulated fixing sheet, a plurality of extending portions extending from a side surface of the fixing sheet, and a latching portion formed on the extending portion engaging the latching groove of the housing. A positive conductive sheet is fixed in the fixing sheet and contacts the positive electrode of the battery.

12 Claims, 3 Drawing Sheets

BATTERY HOLDER AND POWER SUPPLY USING THE SAME

BACKGROUND

1. Technical Field

The present disclosure relates to a battery holder and, particularly, to a power supply using the battery holder.

2. Description of the Related Art

A typical power supply for an electronic device includes a battery and a battery holder to receive the battery. The battery includes a positive electrode and a negative electrode opposite to the positive electrode. The battery holder includes a housing, a first conductive sheet, a second conductive sheet, a spring and a protecting member. The housing is substantially a cylindrical sleeve. The first conductive sheet and the second conductive sheet are correspondingly fixed on an inner surface of the housing at two ends. The protecting member is substantially a circular plastic sheet. The protecting member defines a through hole in a center of the protecting member. The protecting member is fixed in the housing adjacent to the first conductive sheet. The battery is received in the housing, and the positive electrode of the battery passes through the through hole of the protecting member and contacts the first conductive sheet. The spring is fixed on the second conductive sheet, and resists the negative electrode of the battery. The battery only can be received in battery when the positive electrode faces the first conductive sheet. If the battery is received in the battery holder in an orientation such that the negative electrode is facing the protecting member, the negative electrode may be blocked by the protecting member and cannot contact the first conductive sheet. Thus, the power supply would not supply power for the electronic device.

However, the protecting member, often adhered on the inner surface of the body by glue, has only a thin side surface contacting the adhesive, resulting in limited bonding with the body.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
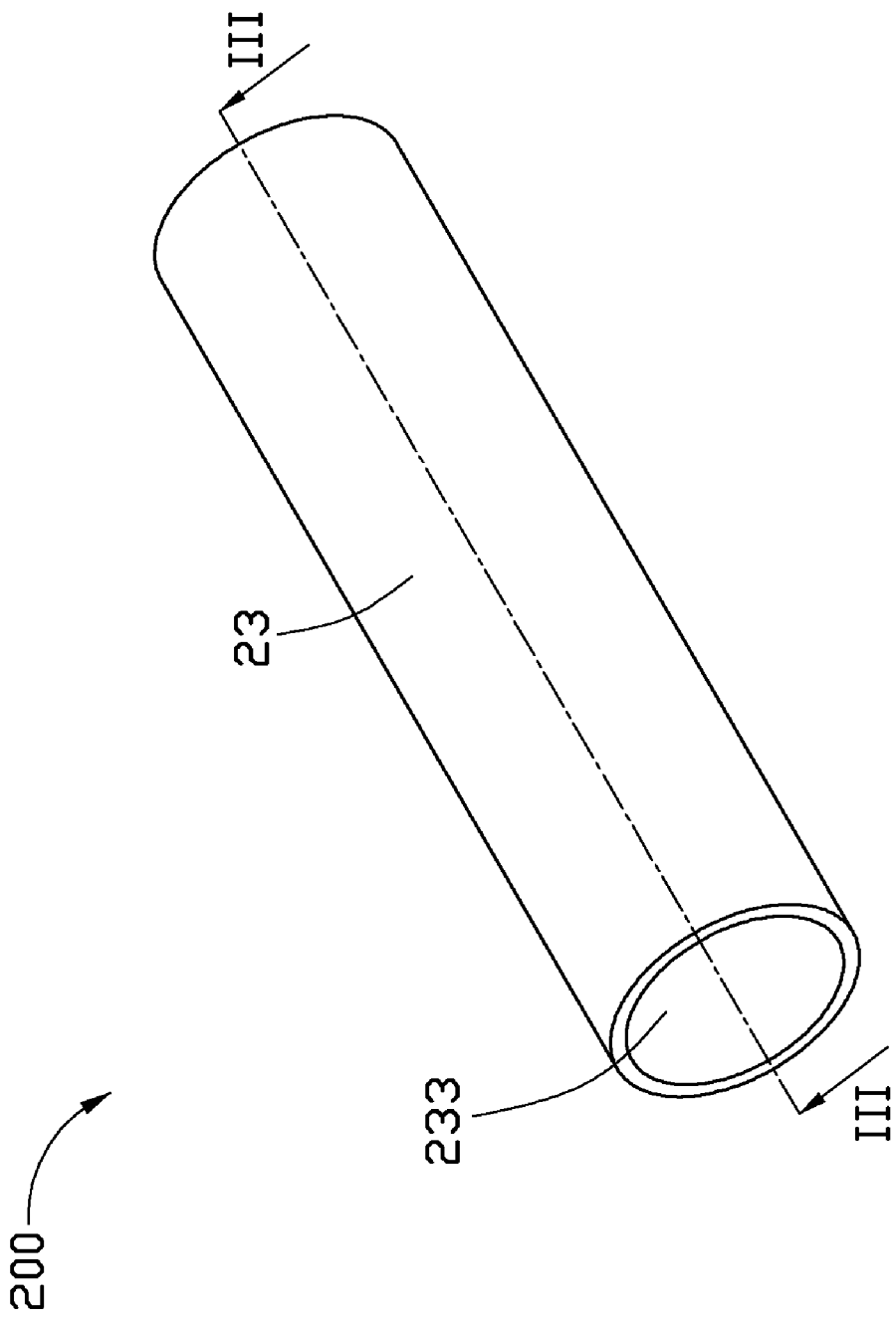
FIG. 1 is an isometric view of an embodiment of a power supply.
Figure 2:
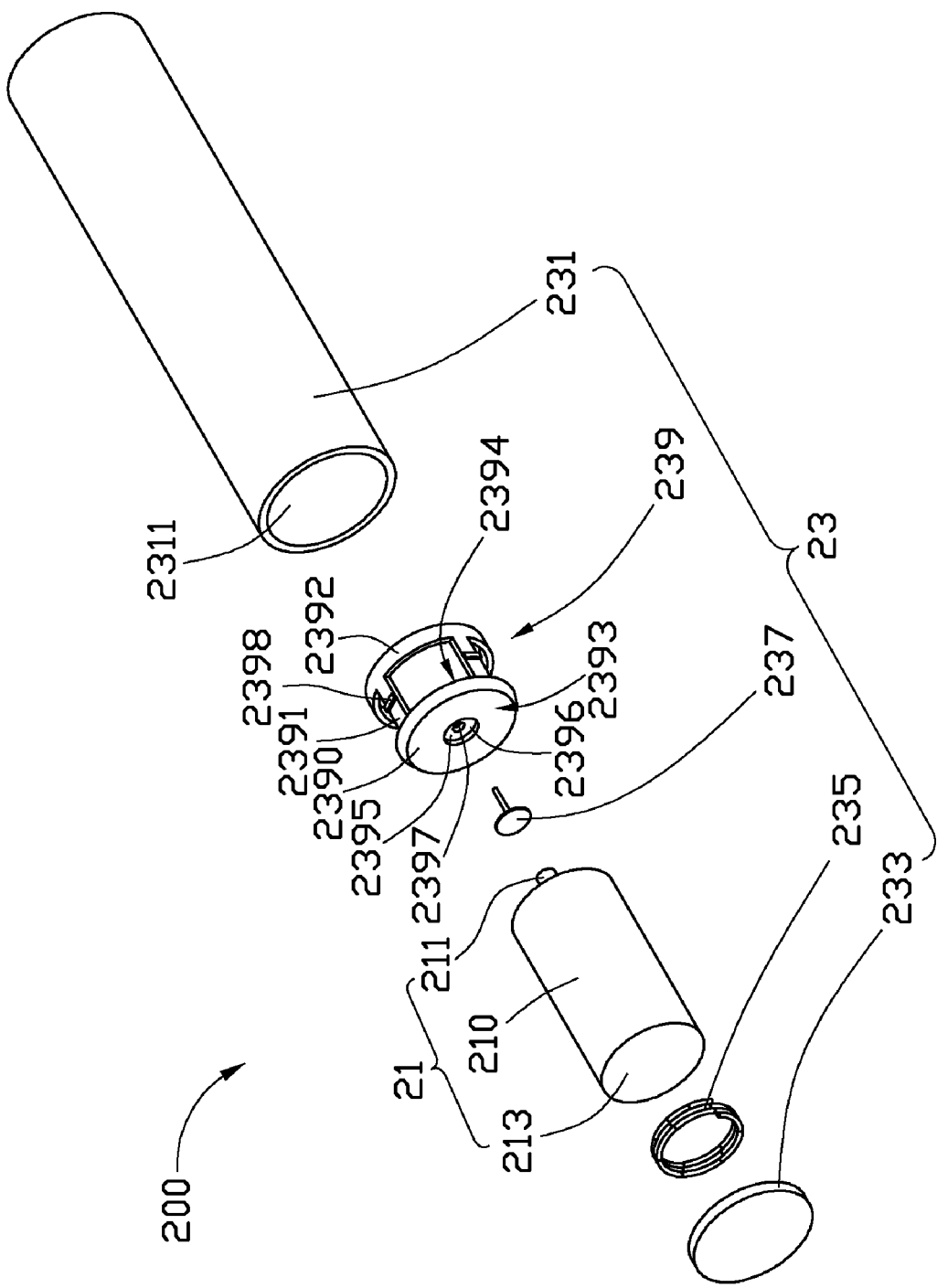
FIG. 2 is an exploded, isometric view of the power supply shown in FIG. 1.

Referring to FIGS. 1 and 2, an embodiment of a power supply 200 includes a battery 21 and a battery holder 23 to receive the battery 21. The battery 21 includes a body 210, a positive electrode 211 and a negative electrode 213. The positive electrode 211 is formed on an end of the body 210 and protrudes out from the end thereof. The negative electrode 213 is formed at the other end of the body 210 opposite to the positive electrode 211. The battery holder 23 includes a housing 231, a negative conductive sheet 233, an elastic member 235, a positive conductive sheet 237 and a protecting member 239.

The housing 231 can be a substantially cylindrical metallic sleeve. The housing 231 defines a chamber 2311 to receive the battery 21. The negative conductive sheet 233 is substantially circular. In the illustrated embodiment, the negative conductive sheet 233 can be fixedly mounted in one end of the housing 231 by gluing or welding. Alternatively, the negative conductive sheet 233 can be detachably mounted in the end of the housing 231 by fasteners, such as screws. The elastic member 235 can be welded on the negative conductive sheet 233. In the illustrated embodiment, the elastic member 235 is a spring. The housing 231 defines a latching groove 2313 in a middle portion of an inner side surface of the housing 231. The latching groove 2313 is an annular groove extending along a circumference of the housing 231.

The protecting member 239 is made of insulated materials, such as plastic. The protecting member 239 includes a fixing sheet 2390, four extending portions 2391 and a connecting portion 2392. The fixing sheet 2390 is substantially circular. A diameter of the fixing sheet 2390 is approximately equal to an inner diameter of the housing 231. The fixing sheet 2390 includes a first surface 2393 and a second surface 2394 opposite to the first surface 2393. The fixing sheet 2390 defines a receiving groove 2395 in the first surface 2393 corresponding to the positive conductive sheet 237. The fixing sheet 2390 further defines a lead channel 2396 in a bottom surface 2396 of the receiving groove 2395. The positive conductive sheet 237 is received in the receiving groove 2395 under a plane of the first surface 2393. The connecting portion 2392 is substantially a ring. The extending portions 2391 are substantially longitudinal, extending substantially perpendicularly from the second surface 2394 at an edge of the fixing sheet 2390, and fixedly connecting the connecting portion 2392. The connecting portion 2392 and the extending portion 2391 can deform and bend inward when clamped. Each extending portion 2391 forms a latching portion 2398 on an outer surface thereof. The latching portion 2398 is substantially elongated, and four latching portions 2398 are substantially at the perimeter.

Figure 3:
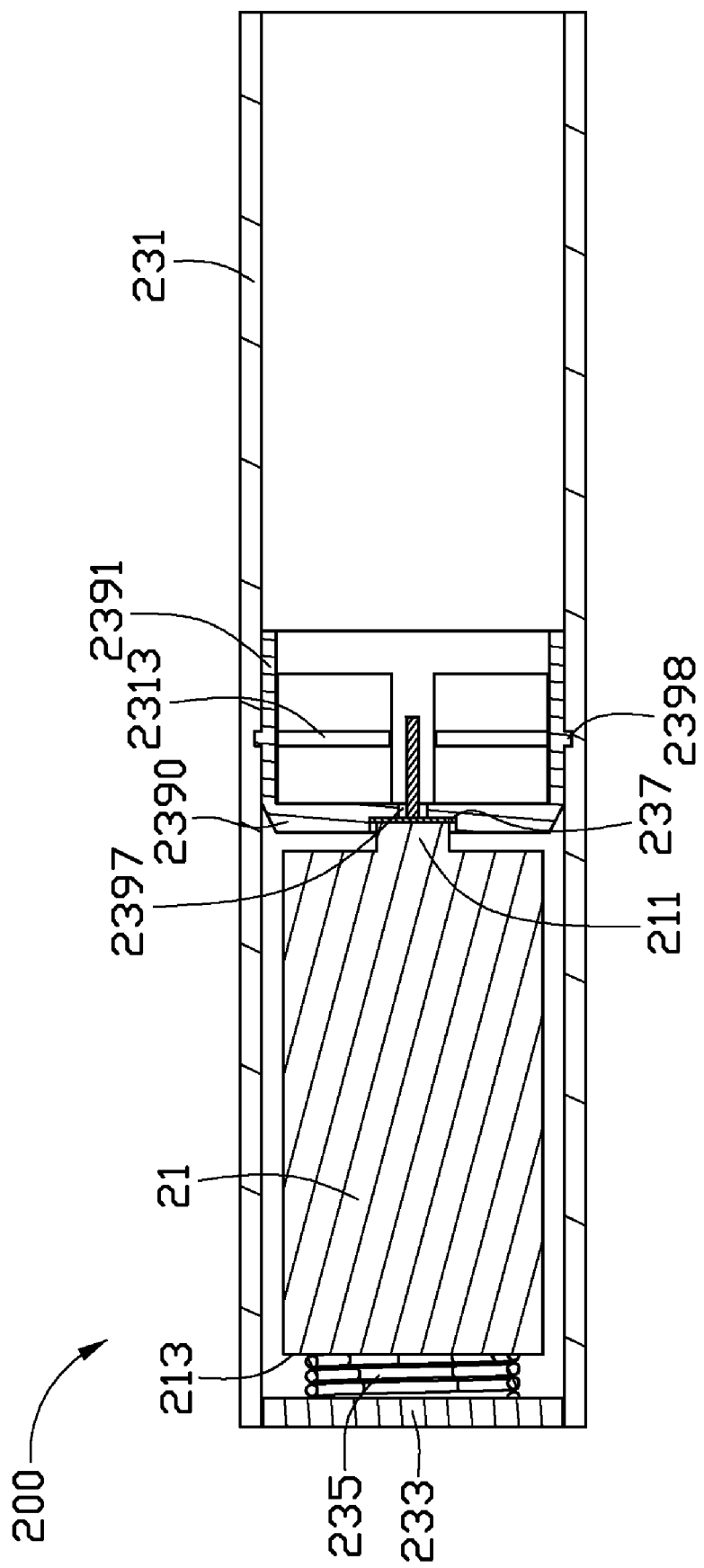
FIG. 3 is a cross-section of the power supply shown in FIG. 1, taken along line III-III.

Referring to FIG. 3, during assembly of the power supply 200, the battery 21 is received in the housing 231 and the negative electrode 213 of the battery 21 is received to contact the elastic member 235. The protecting member 239 is inserted into the housing 231. At this time, the connecting portion 2392 of the protecting member 239, upon receiving an external force, is deformed and the extending portions 2391 correspondingly bend inward. When the latching portion 2398 engages the latching groove 2313, the connecting portion 2392 and the extending portions 2391 rebound. At the same time, the compressed elastic member 235 resists the battery 210 and impels the positive electrode 211 partly being inserted into the receiving groove 2395 to contact the positive conductive sheet 237.

In use, the negative conductive sheet 233 and the positive conductive sheet 237 are connected to the electronic device via leads (not shown), allowing power to be provided to the electronic device. If the battery 21 is mounted in the housing 231 such that the negative electrode 213 faces the protecting member 239, the negative electrode 213 may be blocked by the first surface of the fixing sheet 2390, and no power is outputted from the power supply 200. Thus, the electronic device can be protected.

The protecting member 239 is fixed in the housing 231 via the engagement of the latching portion 2398 and the latching groove 2313. The extending portions 2392 apply an elastic force retaining the latching portion 2398 in the latching groove 2313, whereby a bond strength of the protecting member 239 is increased.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A power supply comprising:
 a battery comprising a positive electrode and a negative electrode opposite to the positive electrode; and
 a battery holder comprising:
  a housing to receive the battery, the housing defining a latching groove in an inner surface thereof;
  an elastic member fixed in the housing and resisting the negative electrode of the battery;
  a protecting member positioned in the housing, the protecting member comprising an insulated fixing sheet, a plurality of extending portions extending from a side surface of the fixing sheet, and a latching portion formed on the extending portion engaging in the latching groove of the housing; and
  a positive conductive sheet fixed in the fixing sheet and contacting the positive electrode of the battery;
 wherein the elastic member, the battery, the positive conductive sheet and the protecting member are coaxially received within the housing in an order as listed above, and the plurality of extending portions extend from the side surface of the fixing sheet along an axial direction of the battery holder and away from the positive electrode of the battery.

2. The power supply of claim 1, wherein the fixing sheet comprises a first surface and a second surface opposite to the first surface, the fixing sheet defines a receiving groove on the first surface to receive the positive conductive sheet, the positive conductive sheet is fixed on a bottom surface of the receiving groove, and the fixing sheet further defines a lead channel at the bottom surface of the receiving groove.

3. The power supply of claim 2, wherein the positive conductive sheet is under a plane of the first surface.

4. The power supply of claim 2, wherein the extending portion is substantially longitudinal, extending perpendicular from the second surface at an edge of the fixing sheet; the number of latching portion equals the number of extending portions; each latching portion is formed on an outer surface of the corresponding extending portion.

5. The power supply of claim 4, wherein the protecting member further comprises a connecting portion connecting an end of the extending portion away from the fixing sheet.

6. The power supply of claim 4, wherein the latching groove is circular; the plurality of the latching portions is substantially at a circumference corresponding to the latching groove.

7. A battery holder for receiving a battery comprising a positive electrode and a negative electrode opposite to the positive electrode, the battery holder comprising:
 a housing to receive the battery, the housing defining a latching groove in an inner surface thereof;
 an elastic member fixed in the housing to resist the negative electrode of the battery;
 a protecting member positioned in the housing, the protecting member comprising an insulated fixing sheet, a plurality of extending portions extending from a side surface of the fixing sheet, and a latching portion formed on the extending portion engaging in the latching groove of the housing; and
 a positive conductive sheet fixed in the fixing sheet and to contact the positive electrode of the battery;
 wherein the elastic member, the battery, the positive conductive sheet and the protecting member are coaxially received within the housing in an order as listed above, and the plurality of extending portions extend from the side surface of the fixing sheet along an axial direction of the battery holder and away from the positive electrode of the battery.

8. The battery holder of claim 7, wherein the fixing sheet comprises a first surface and a second surface opposite to the first surface, the fixing sheet defines a receiving groove on the first surface to receive the positive conductive sheet, the positive conductive sheet is fixed on a bottom surface of the receiving groove, and the fixing sheet further defines a lead channel at the bottom surface of the receiving groove.

9. The battery holder of claim 8, wherein the positive conductive sheet is under a plane of the first surface.

10. The battery holder of claim 8, wherein the extending portion is substantially longitudinal, extending perpendicular from the second surface at an edge of the fixing sheet; the number of latching portion equals the number of extending portions each latching portion is formed on an outer surface of the corresponding extending portion.

11. The battery holder of claim 10, wherein the protecting member further comprises a connecting portion connecting an end of the extending portion away from the fixing sheet.

12. The battery holder of claim 10, wherein the latching groove is circular; the plurality of the latching portions is substantially at a circumference corresponding to the latching groove.

* * * * *